G. F. HAMMOND.
AUTOMATIC SWITCH.
APPLICATION FILED OCT. 12, 1917.

1,269,079.

Patented June 11, 1918.
2 SHEETS—SHEET 1.

WITNESSES

George F. Hammond, INVENTOR

ATTORNEYS

G. F. HAMMOND.
AUTOMATIC SWITCH.
APPLICATION FILED OCT. 12, 1917.

1,269,079.

Patented June 11, 1918.
2 SHEETS—SHEET 2.

WITNESSES

George F. Hammond, INVENTOR

BY
ATTORNEYS

UNITED STATES PATENT OFFICE.

GEORGE F. HAMMOND, OF MONTECITO, CALIFORNIA.

AUTOMATIC SWITCH.

1,269,079.  Specification of Letters Patent.  Patented June 11, 1918.

Application filed October 12, 1917. Serial No. 196,197.

*To all whom it may concern:*

Be it known that I, GEORGE F. HAMMOND, a citizen of the United States, and a resident of Montecito, in the county of Santa Barbara, and State of California, have invented a new and useful Improvement in Automatic Switches, of which the following is a specification.

My present invention relates generally to automatic switches, and particularly to the control of one switch station from a distant control station, so that power may be turned on and off at the first station without requiring the services of a control operator at that point. Briefly, my invention includes a mechanical switch arrangement having electrically operated controlling means whereby the movements of the mechanical parts into and out of operative relation, may be controlled from a distant point through the electrical features.

In the accompanying drawings illustrating my present invention,

Figure 4:
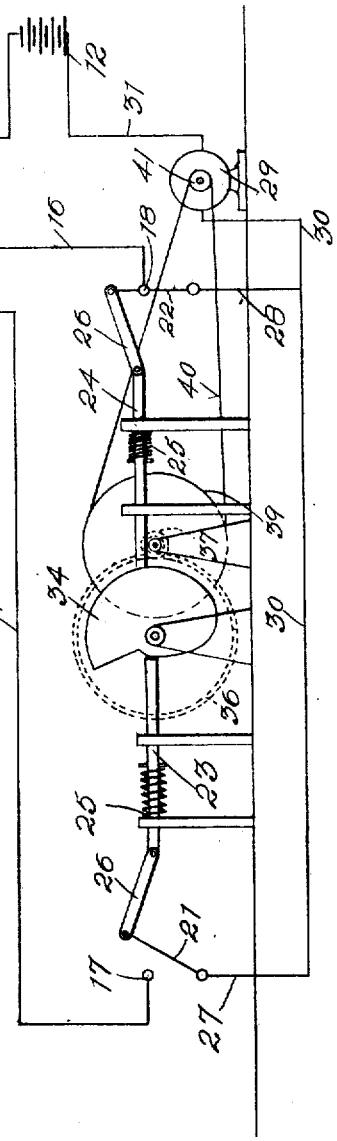
Fig. 4 is a diagram illustrating the circuit connections of the electrical controlling parts.

Referring now to these figures and particularly to Fig. 4, a description of which will serve to better show the results obtained, a double-throw switch arranged at the controlling station has its arm 10 in circuit through a wire 11 with one side of a battery or other suitable source of current indicated generally at 12, one of the contacts 13 of said switch being connected to a wire 14 and the other contact 15 being connected to a wire 16.

Figure 1:
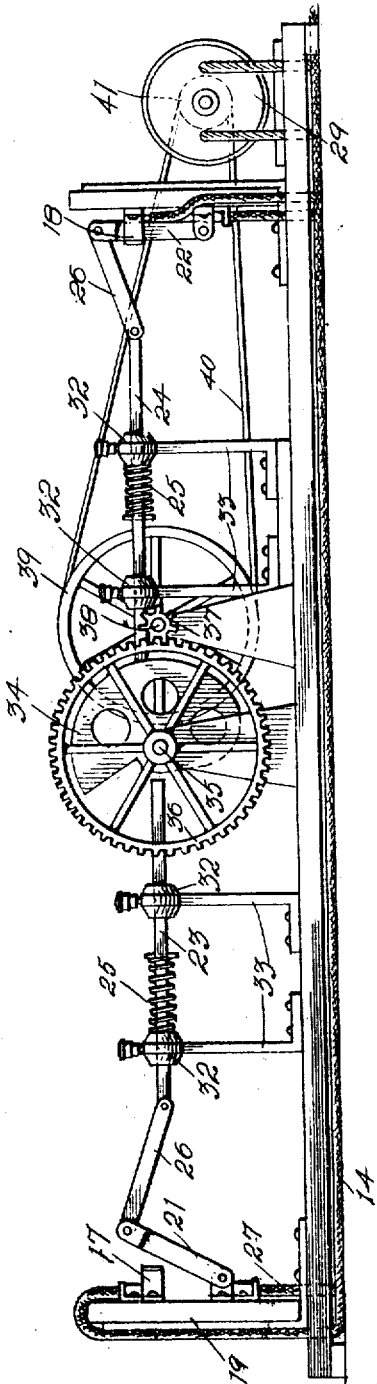
Figure 1 is a side view of my improved switch mechanism in one position.
Figure 3:
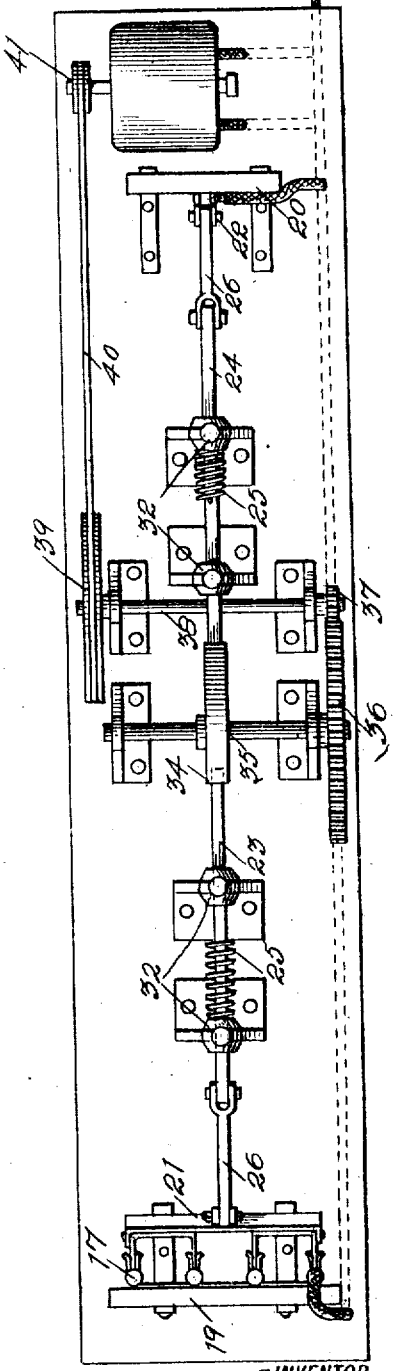
Fig. 3 is a top plan view showing the parts in the position of Fig. 1.
Figure 2:
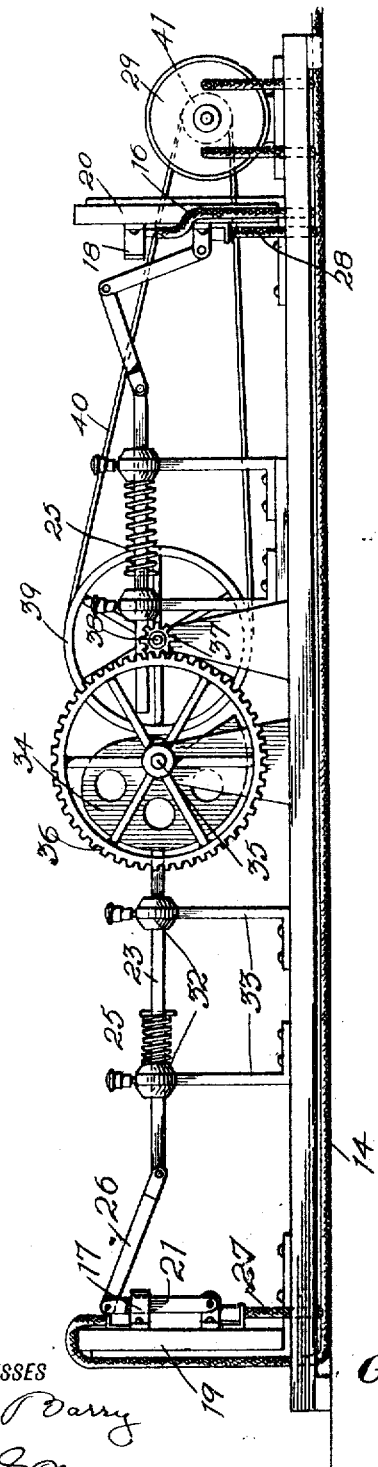
Fig. 2 is a similar view with the parts in the opposite position.

These wires 14 and 16 lead to the distant station to be controlled and are connected respectively, to the contacts 17 and 18 of opposing switches, these switches being better seen at 19 and 20 in Figs. 1 to 3.

The switch arms 21 and 22, respectively, of these switches 19 and 20, are connected to spring controlled slide bars 23 and 24, the springs 25 of which normally hold the switch arms 21 and 22 in disengaged relation, said switch arms being connected to the slide bars 23 and 24 by links 26, and being also connected to wires 27 and 28, respectively, the latter of which are connected to a small electric motor 29 through a wire 30, said motor 29 being connected in turn through a wire 31 with the opposite side of the battery 12 or other source of current with respect to the wire 11.

Referring now to the mechanical features of the switch as seen in Figs. 1 to 3, inclusive, it will be noted that the slide bars 23 and 24 move through the upper bearings 32 of supporting uprights 33, and that said slide bars have their inner ends in spaced opposing relation to be alternately engaged and shifted longitudinally against the tension of their springs 25, by means of an enlarged cam member 34 mounted upon the shaft 35 with a gear wheel 36, the latter in engagement with the gear wheel 37 of a counter-shaft 38 having an enlarged pulley 39 thereon connected by a belt 40 with the pulley 41 upon the shaft of the motor 29. The cam 34 is so situated as shown, by virtue of the foregoing arrangement, that when one of the slide bars is engaged and thrust longitudinally to shift its respective switch into engaged position, the other slide bar is released so that its spring will act to withdraw its respective switch arm from engaged position, as seen by a comparison of Figs. 1 and 2.

Thus, again referring to Fig. 4, when the controlling switch 10 is moved on to contact 15, a circuit is completed from battery 12 through wire 11, switch 10, contact 15, wire 16, to switch contact 18 and through switch 22, (assuming that the latter is in the operative position shown) wire 28, wire 30, motor 29, wire 31, back to battery 12, thus rotating motor 29, which in turn rotates the cam shaft 35 through the counter-shaft 38, and shifts the cam 34 so as to disengage slide bar 24 and engage slide bar 23. In this operation the parts are moved from the position shown in Fig. 1 to the position shown in Fig. 2, and as soon as slide bar 24 is released, and its spring 25 acts to retract the same and withdraw its respective switch arm 22 from engaged position, the circuit just above traced, is broken between contact 18 and wire 28 of Fig. 4 so that the motor stops. The parts then remain in the position shown in Fig. 2 until the switch 10 at the controlling station is shifted to the contacts 13, at which time a circuit is completed from battery 12 through wire 11, switch arm 10, contacts 13, wire 14, contacts 17 and through switch arm 21 at that time in operative position, wire 27, wire 30, motor 29, wire 31, back to battery, thus again starting the motor and resulting in the shifting of the cam 34 from the position shown in Fig. 2 to the position shown in Fig. 1, shifting the switch arm 22 into operative position and releasing switch arm 21, which latter at once breaks the motor circuit.

It is obvious from the foregoing that my invention presents considerable advantage in its control of power at a distant point, from a controlling station at any point, remote or otherwise, and in dispensing with an attendant at the distant station to be controlled, whose ordinary duty is to apply or disconnect power at the proper time.

I claim:

1. In an apparatus of the character described, a pair of opposed switches having movable switch arms, a pair of opposed spring-controlled shifting members connected to said switch arm and normally maintaining the latter in inoperative position, and a cam rotatable between the said shifting members and arranged to simultaneously engage and shift one of said members and release the other.

2. In an apparatus of the character described, a pair of opposed switches having movable switch arms, a pair of slide bars each of which is connected at one end to the arm of one of said switches, said slide bars having their opposite ends in opposing relation, and a rotatable cam mounted in the space between the said opposed ends of the slide bars and arranged to simultaneously engage and shift one of the slide bars and release the other, each of said slide bars having a controlling spring engaging the same to normally hold it in inoperative position.

3. In an apparatus of the character described, a pair of opposed circuit closing members having movable contacts, a pair of opposed shifting members connected to said movable contacts to shift the latter into and out of operative position, springs for moving said shifting members in one direction, and a cam member rotatable between the said shifting members to move the latter in the opposite direction, and arranged to simultaneously engage one of said shifting members and release the other.

GEORGE F. HAMMOND.